April 1, 1924.
E. AVALOS
EMERGENCY AXLE FOR AUTOMOBILES
Filed May 16, 1922
1,488,464
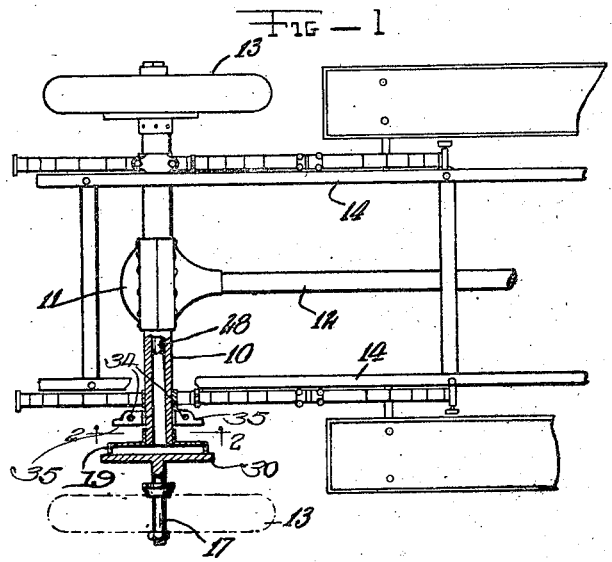
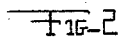
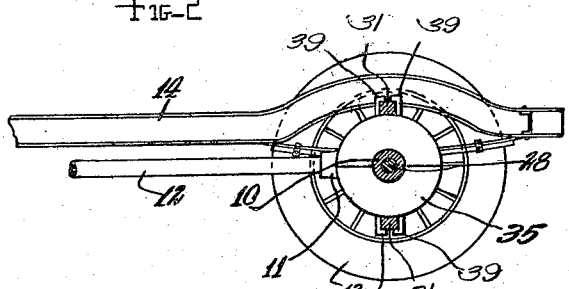
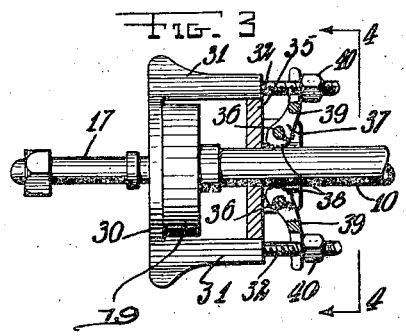
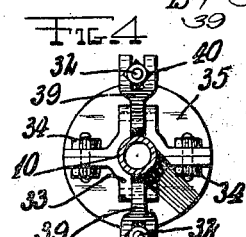
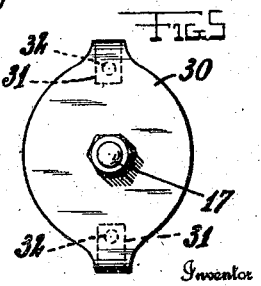
Inventor
Emeterio Avalos
By *(signature)*
Attorney Patented Apr. 1, 1924.

1,488,464

UNITED STATES PATENT OFFICE.

EMETERIO AVALOS, OF EL PASO, TEXAS.

EMERGENCY AXLE FOR AUTOMOBILES.

Application filed May 16, 1922. Serial No. 561,542.

*To all whom it may concern:*

Be it known that I, EMETERIO AVALOS, a citizen of Mexico, residing at El Paso, in the county of El Paso and State of Texas, have invented certain new and useful Improvements in Emergency Axles for Automobiles, of which the following is a specification.

This invention relates generally to automobiles, having more particular reference to the provision of a supplementary axle section which may be temporarily substituted for a broken section of the axle, and have the wheel mounted thereon.

The invention has for an object to provide a novel and simple device of the above type which can be conveniently carried in an automobile, and readily applied when desired.

For further comprehension of the invention, and of the objects and advantages thereof, reference will be had to the following description and accompanying drawings, and to the appended claims in which the various novel features of the invention are more particularly set forth.

Fig. 1 of the drawings is a fragmentary plan view, with parts in horizontal section, showing an automobile chassis having the invention applied thereto.

Fig. 2 is a vertical section on the line 2—2 of Fig. 1.

Fig. 3 is a fragmentary elevation, with parts in section, of the invention applied to a vehicle.

Fig. 4 is a vertical sectional view taken on the line 4—4 of Fig. 3.

Fig. 5 is a face view of the auxiliary wheel supporting element.

Referring now to the drawings the reference numeral 10 indicates the usual sleeve or housing which encloses the rear axle of an automobile, the usual gear-box being indicated at 11, the wheels being indicated at 13 and the usual main side frames at 14.

The usual brake shoe on the sleeve 10 is indicated at 19, As here shown my improved device comprises a disc 30 adapted to be fitted against the shoe 19 and formed with a spindle 17 which engages in the hub of the wheel in the usual manner. From opposite sides of this disc a pair of rigid fingers 31 project inwardly, parallel to the sleeve 10 and are formed with screw extensions 32. Upon the sleeve 10 is fitted a split collar 33 the two halves of which may be secured together by bolts, this collar having a radially projected flange 35 at one end of each half thereof adapted to engage the inner, radially considered, face of the adjacent finger 31. Pivoted as at 36 to this collar 33 are gripper jaws 37 having serrated faces 38 arranged slightly eccentric to the pivot points 36 and adapted to bear on the sleeve 10. These gripper jaws have forked integral arms 39 which straddle the screw extensions 32, these latter having nuts 40 threaded thereon and bearing on the arms 39.

In the use of the invention, the collar 33 is secured on the sleeve inside (considered transversely of the automobile) the brake shoe 19. The disk 30 is then fitted over the said shoe with its fingers 31 projecting over the flanges 35. The arms 39 are then swung over the ends of the screws 32, and the nuts 40 screwed thereon. As the nuts are tightened against the arms 39 they cause the serrated jaw faces 38 to grip the sleeve 10, this gripping action increasing in proportion as the disk 30 is tightened against the drum. The wheel may then be mounted on the spindle 17, the usual brake drum attached to the wheel being first removed from the latter.

Having thus described my invention what I claim as new and desire to protect by Letters Patent of the United States is as follows:

1. A device of the class described comprising a disk having a wheel supporting element projecting axially therefrom, threaded fingers projecting rigidly from the disk, a collar adapted for fixing on the sleeve enclosing the rear axle of an automobile, cam devices adapted to fix the collar rigidly upon the sleeve, and nuts threaded on said fingers and bearing against said cam devices.

2. A device of the class described comprising a disk having a wheel supporting element projecting axially therefrom, fingers projecting rigidly from the disk, a collar adapted for fixing on the sleeve enclosing the rear axle of an automobile, and a common means for causing said collar to be fixed rigidly upon the said sleeve and for tightening the disk against the end of the sleeve, said means comprising screw extensions on said fingers, gripper jaws pivoted on said collar, forked arms extending therefrom and adapted to straddle said screw extensions, and nuts threaded on said screw extensions and bearing against said arms.

In testimony whereof I have affixed my signature.

EMETERIO AVALOS.